(12) United States Patent
Tsujii et al.

(10) Patent No.: US 7,800,347 B2
(45) Date of Patent: Sep. 21, 2010

(54) CONTROL APPARATUS OF DC-DC CONVERTER

(75) Inventors: Shintaro Tsujii, Toyota (JP); Hichirosai Oyobe, Toyota (JP); Kenji Yamada, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/501,519

(22) Filed: Jul. 13, 2009

(65) Prior Publication Data
US 2010/0007323 A1 Jan. 14, 2010

(30) Foreign Application Priority Data
Jul. 14, 2008 (JP) .............................. 2008-182412

(51) Int. Cl.
*G05F 1/70* (2006.01)
(52) U.S. Cl. .................. 323/205; 323/207; 323/206
(58) Field of Classification Search .......... 323/205–211
See application file for complete search history.

(56) References Cited

U.S. PATENT DOCUMENTS

| | | | | |
|---|---|---|---|---|
| 4,780,660 A | * | 10/1988 | Shima et al. ................ | 323/207 |
| 5,198,972 A | * | 3/1993 | Lafuze ........................ | 323/207 |
| 5,283,726 A | * | 2/1994 | Wilkerson ................... | 323/207 |
| 2008/0129266 A1 | * | 6/2008 | Endo et al. ................. | 323/284 |
| 2009/0206902 A1 | * | 8/2009 | Li .............................. | 327/176 |

FOREIGN PATENT DOCUMENTS

| | | |
|---|---|---|
| JP | 2004112904 A | 4/2004 |
| JP | 2006311635 A | 11/2006 |
| JP | 2008104244 A | 5/2008 |
| JP | 2008312278 A | 12/2008 |
| WO | WO-2009001615 A1 | 12/2008 |

\* cited by examiner

*Primary Examiner*—Jessica Han
(74) *Attorney, Agent, or Firm*—Gifford, Krass, Sprinkle, Anderson & Citkowski, P.C.

(57) ABSTRACT

A control apparatus of a DC-DC converter includes a reactor and a switching element, repeats an accumulation and a discharge of energy of the reactor by a switching operation of the switching element, and converts a direct-current input voltage to acquire a direct-current output voltage. The control apparatus includes: a current value acquiring unit that acquires current values of the reactor in a current rising section and a current descending section of a current waveform of the reactor at a time interval of a half of a switching period of the switching element; and a center value estimating unit that estimates a center value of a current of the reactor based on the current values acquired in the current rising section and the current descending section.

7 Claims, 11 Drawing Sheets

CONTROL APPARATUS OF DC-DC CONVERTER

CROSS-REFERENCE TO RELATED APPLICATION

The priority application Number JP 2008-182412 filed on Jul. 14, 2008 upon which this patent application is based is hereby incorporated by reference.

BACKGROUND OF THE INVENTION

1. Field of the Invention

The present invention relates to a control apparatus of a DC-DC converter.

2. Description of the Related Art

The following DC-DC converter has been known. That is, the DC-DC converter has a reactor and a switching element, repeats the accumulation and discharge of energy in the reactor by the switching operation of the switching element, and converts (steps up or steps down) a direct-current input voltage to acquire a direct-current output voltage.

Japanese Patent Laid-Open Publication No. 2004-112904 describes a voltage converting apparatus for converting a direct-current voltage from a direct-current power supply into an output voltage so that the output voltage may correspond to an instruction voltage. The voltage converting apparatus detects a reactor current, compares the detected reactor current with the ripple current of the reactor current, and changes the carrier frequency for turning on and off the switching element according to the comparison result.

SUMMARY OF THE INVENTION

There is a now demand for acquiring the current of a reactor accurately in a DC-DC converter. For example, there is a demand for acquiring the current of a reactor accurately in order to accurately control the electric power to be supplied from a DC-DC converter to a load.

Accordingly the present invention provides a control apparatus of a DC-DC converter capable of acquiring the current of the reactor of the DC-DC converter accurately.

According to one aspect of the present invention, there is provided, a control apparatus of a DC-DC converter including a reactor and a switching element, the apparatus repeating an accumulation and a discharge of energy of the reactor by a switching operation of the switching element to convert a direct-current input voltage for acquiring a direct-current output voltage, the apparatus having: a current value acquiring unit that acquires current values of the reactor in a current rising section and a current descending section of a current waveform of the reactor at a time interval of a half of a switching period of the switching element; and a center value estimating unit that estimates a center value of a current of the reactor based on the current values acquired in the current rising section and the current descending section.

According to another aspect of the present invention, the control apparatus of a DC-DC converter may further include a timing correcting unit that corrects timings of acquiring the current values of the reactor in a delaying direction when a value acquired by subtracting the current value acquired in the current rising section from the current value acquired in the current descending section is positive, and corrects the timings of acquiring the current values of the reactor in an advancing direction when the value acquired by the subtraction is negative.

According to another aspect of the present invention, the control apparatus of a DC-DC converter may further include: a timing error estimating unit that estimates an error between timings of acquiring the current values of the reactor and timings of the center value of the current of the reactor based on the current values acquired in the current rising section and the current descending section; and a timing correcting unit that corrects the timings of acquiring the current values of the reactor based on the estimated error.

According to another aspect of the present invention, the control apparatus of a DC-DC converter may repeatedly execute processing of acquiring the current values, estimating the error, and correcting the timings.

According to another aspect of the present invention, there is provided, a control apparatus of a DC-DC converter including a reactor and a switching element, the apparatus repeating an accumulation and a discharge of energy of the reactor by a switching operation of the switching element to convert a direct-current input voltage for acquiring a direct-current output voltage, the apparatus having: a current value acquiring unit that acquires current values of the reactor in a current rising section and a current descending section of a current waveform of the reactor at a time interval of a half of a switching period of the switching element; and a timing correcting unit that corrects timings of acquiring the current values of the reactor in a delaying direction when a value acquired by subtracting the current value acquired in the current rising section from the current value acquired in the current descending section is positive, and corrects the timings of acquiring the current values of the reactor in an advancing direction when the value acquired by the subtraction is negative.

According to another aspect of the present invention, there is provided, a control apparatus of a DC-DC converter including a reactor and a switching element, the apparatus repeating an accumulation and a discharge of energy of the reactor by a switching operation of the switching element to convert a direct-current input voltage for acquiring a direct-current output voltage, the apparatus having: a current value acquiring unit that acquires current values of the reactor in a current rising section and a current descending section of a current waveform of the reactor at a time interval of a half of a switching period of the switching element; a timing error estimating unit that estimates an error between timings of acquiring the current values of the reactor and timings of a center value of a current of the reactor based on the current values acquired in the current rising section and the current descending section; and a timing correcting unit that corrects the timings of acquiring the current values of the reactor based on the estimated error.

According to another aspect of the present invention, the control apparatus of a DC-DC converter may repeatedly execute processing of acquiring the current values, estimating the error, and correcting the timings.

According to the present invention, a control apparatus of a DC-DC converter capable of acquiring the current of the reactor of the DC-DC converter accurately can be provided.

DESCRIPTION OF PREFERRED EMBODIMENTS

In the following, the embodiments of the present invention will be described with reference to the attached drawings.

Figure 1:
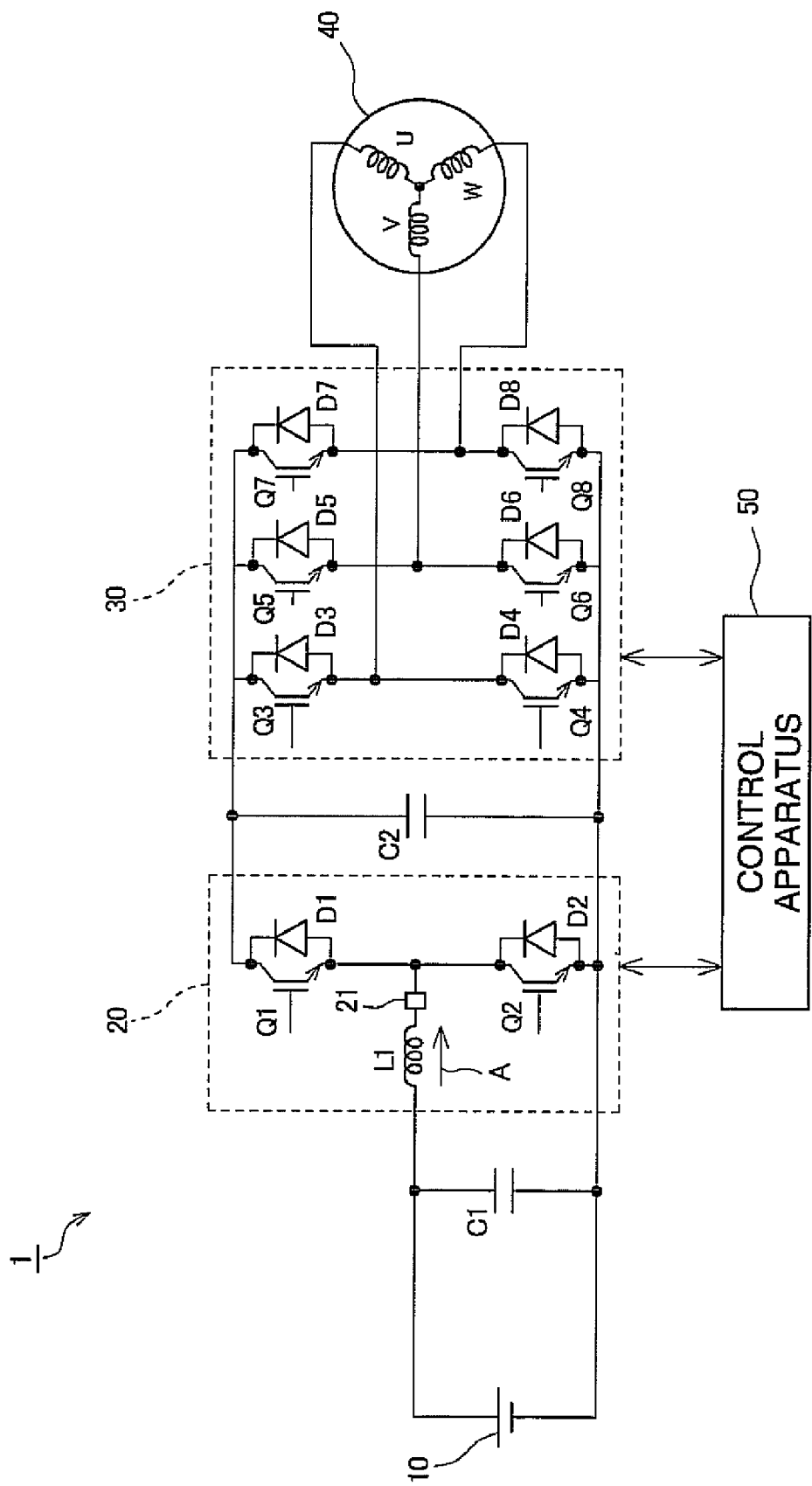
FIG. 1 is a diagram showing the schematic configuration of an electric vehicle including a control apparatus of a DC-DC converter according to an embodiment.

FIG. 1 is a diagram showing the schematic configuration of an electric vehicle 1 including a control apparatus of a DC-DC converter according to the present embodiment. The electric vehicle 1 is a vehicle driving a car by driving a drive motor by means of the electric power of an electric storage device. The electric vehicle 1 is, for example, a hybrid vehicle (HV), a so-called electric vehicle (EV), or a fuel cell electric vehicle (FCEV).

Incidentally, although FIG. 1 illustrates the case where the control apparatus of a DC-DC converter according to the present embodiment is applied to the electric vehicle, the control apparatus of a DC-DC converter according to the present embodiment may be applied to other than the electric vehicle.

In FIG. 1, the electric vehicle 1 includes an electric storage device 10, a DC-DC converter 20, an inverter 30, a drive motor 40, and a control apparatus 50.

The electric storage device 10 accumulates electric power therein and outputs a direct-current voltage, and is a secondary battery, such as a nickel hydrogen battery or a lithium ion battery, here. Incidentally, the electric storage device 10 may be a large-capacity capacitor or the like.

The DC-DC converter 20 is a device, including a reactor and switching elements, for acquiring a direct-current output voltage by converting a direct-current input voltage by repeating the accumulation and discharge of the energy in the reactor by the switching operations of the switching elements. In the example shown in FIG. 1, the DC-DC converter 20 is a bidirectional DC-DC converter performing stepping up and stepping down.

To put it concretely, in FIG. 1, the DC-DC converter 20 includes a reactor L1, switching elements (such as insulated gate bipolar transistors (IGBTs)) Q1 and Q2, and diodes D1 and D2. The switching elements Q1 and Q2 are connected in series between the power source line of the inverter 30 and the earth line. The collector of the switching element Q1 of an upper arm is connected to the power source line, and the emitter of the switching element Q2 of a lower arm is connected to the earth line. One end of the reactor L1 is connected to the intermediate point of the switching elements Q1 and Q2, that is, the connection point of the emitter of the switching element Q1 and the collector of the switching element Q2. The other end of the reactor L1 is connected to the positive electrode of the electric storage device 10. Moreover, the emitter of the switching element Q2 is connected to the negative electrode of the electric storage device 10. Moreover, the diodes D1 and D2 are arranged between the collectors and emitters of the switching elements Q1 and Q2, respectively, so as to make currents flow from the emitter sides to the collector sides. A smoothing capacitor C1 is connected between the other end of the reactor L1 and the earth line, and a smoothing capacitor C2 is connected between the collector of the switching element Q1 and the earth line.

The inverter 30 is composed of the respective arms of U phase, V phase, and W phase, which are arranged between the power source line and the earth line in parallel with one another. The U phase arm is composed of a serial connection of switching elements Q3 and Q4, the V phase arm is composed of a serial connection of switching elements Q5 and Q6, and the W phase arm is composed of a serial connection of switching elements Q7 and Q8. The switching elements Q3-Q8 are, for example, IGBTs. Diodes D3-D8 are arranged between the collectors and emitters of the switching elements Q3-Q8, respectively, so as to make currents flow from the emitter sides to the collector sides.

The drive motor 40 is a three-phase permanent magnet motor, and is configured so that one ends of three coils in U, V, and W phases are commonly connected to one another at their center point. The other ends of the U, V, and W phase coils are connected to the intermediate points of the switching elements Q3 and Q4, Q5 and Q6, and Q7 and Q8, respectively.

The control apparatus 50 controls the DC-DC converter 20 and the inverter 30 to control the driving and regenerating of the drive motor 40. The control apparatus 50 is realized by the cooperation of hardware resources and software in one embodiment, and is, for example, an electronic control unit (ECU). To put it concretely, the functions of the control apparatus 50 are realized by the readout of a control program recorded on a recording medium into the main memory of the control apparatus 50, and the execution of the read-out program by the central processing unit (CPU) of the control apparatus 50. The control program can be provided in the form of being recorded on a computer-readable recording medium, or can be provided as a data signal by communication. Incidentally, the control apparatus 50 may be realized only by hardware. Moreover, the control apparatus 50 may be realized by physically a single item of equipment or a plurality of items of equipment.

To put it concretely, the control apparatus 50 controls the DC-DC converter 20 to step up the direct-current power of the electric storage device 10 with the DC-DC converter 20 and to supply the stepped-up direct-current power to the inverter 30 side at the time of power running of the drive motor 40. To put it concretely, the control apparatus 50 performs the control of turning on and off the switching elements Q1 and Q2 of the DC-DC converter 20 alternately. When the switching element Q2 is turned on, a current flows through the reactor L1 through the switching element Q2, and the direct-current power from the electric storage device 10 is accumulated in the reactor L1. Then, when the switching element Q2 is turned off, the direct-current power accumulated in the reactor L1 is output to the side of the inverter 30 through the diode D1. Moreover, the control apparatus 50 controls the switching operations of the switching elements Q3-Q8 of the inverter 30 to convert the direct-current power from the DC-DC converter 20 into alternating-current power with the inverter 30 and to supply the acquired alternating-current power to the drive motor 40. Thereby, the drive motor 40 is driven to rotate.

Moreover, at the time of the regeneration of the drive motor 40, the control apparatus 50 controls the switching operations of the switching elements Q3-Q8 of the inverter 30 to convert the alternating-current power generated by the drive motor 40 into direct-current power with the inverter 30 and to supply the acquired direct-current power to the DC-DC converter 20. Moreover, the control apparatus 50 controls the DC-DC converter 20 to step down the direct-current power from the inverter 30 with the DC-DC converter 20 and to charge the electric storage device 10. To put it concretely, the control apparatus 50 performs the control of turning on and off the switching elements Q1 and Q2 of the DC-DC converter 20 alternately. When the switching element Q1 is turned on, a current flows through the reactor L1 through the switching element Q1, and the direct-current power from the inverter 30 is accumulated in the reactor L1. Then, when the switching element Q1 is turned off, a current flows back through the diode D2 due to the electromotive force of the reactor L1, and thereby the direct-current power accumulated in the reactor L1 is supplied to the electric storage device 10. As a result, the electric storage device 10 is charged.

For the switching operations of the switching elements Q1 and Q2 of the DC-DC converter 20 at the time of stepping up and stepping down, a period (called dead time) during which both the switching elements Q1 and Q2 are in their off states is provided just before the change of the switching element Q1 to its on state and just before the change of the switching element Q2 to its on state in a concrete embodiment.

Furthermore, in the present embodiment, the control apparatus 50 has the function of acquiring the current (hereinafter referred to as reactor current) flowing through the reactor L1 with the object of controlling the electric power to be supplied from the DC-DC converter 20 to the load (drive motor 40) and the other objects. In the following, this function will be described in detail with reference to the attached drawings.

Figure 2:
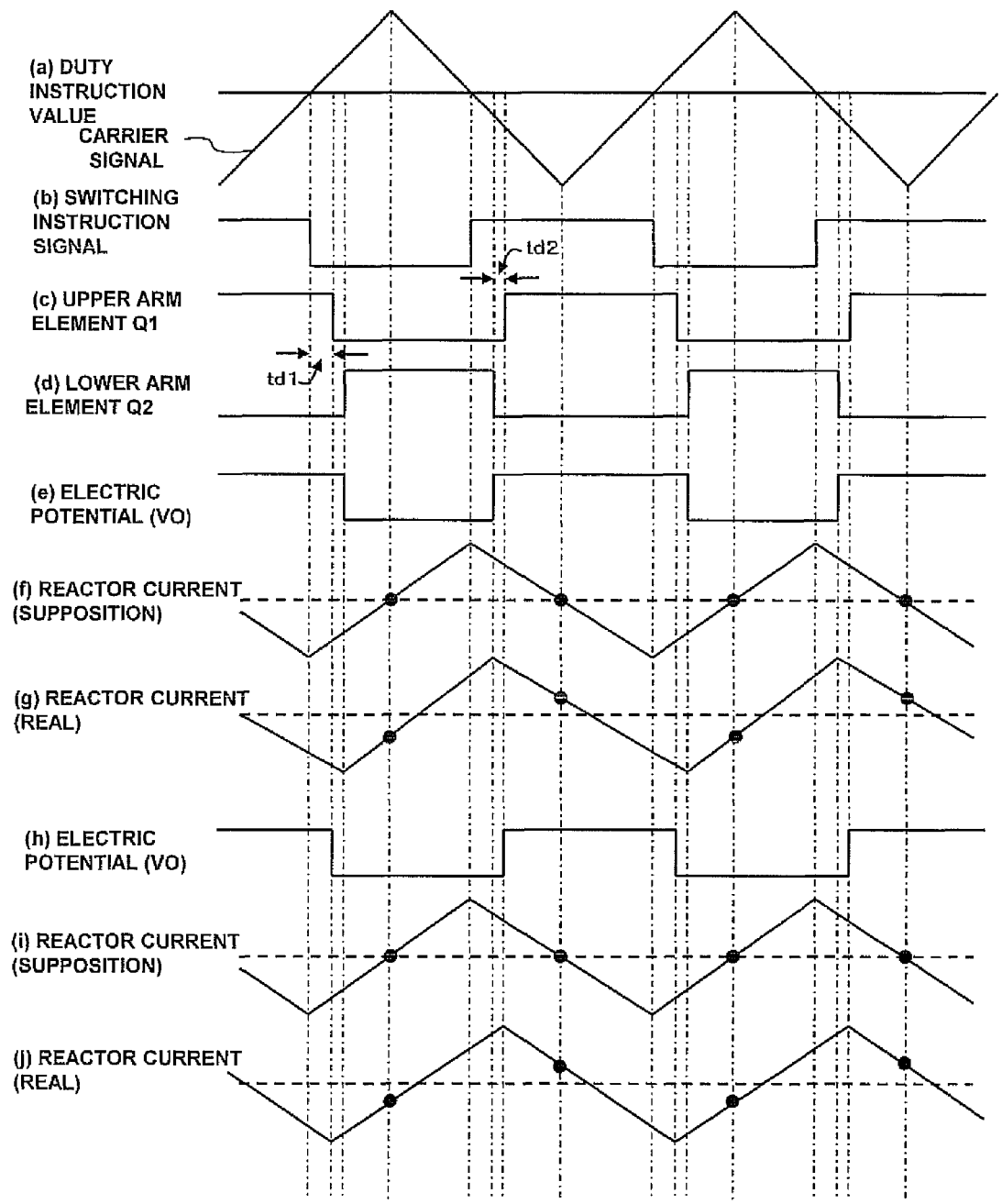
FIG. 2 is a time chart for illustrating the operation of the DC-DC converter and control apparatus.

FIG. 2 is a time chart for illustrating the operations of the DC-DC converter 20 and control apparatus 50.

The control apparatus 50 generates a switching instruction signal shown in FIG. 2b on the basis of a carrier signal in a triangular wave and a duty instruction value shown in FIG. 2a, and supplies the generated switching instruction signal to the DC-DC converter 20 through a transmission circuit. To put it concretely, the control apparatus 50 compares the carrier signal with the duty instruction value. When the carrier signal is equal to or more than the duty instruction value, the control apparatus 50 makes the switching instruction signal its low level. When the carrier signal is less than the duty instruction value, the control apparatus 50 makes the switching instruction signal its high level. Incidentally, the control apparatus 50 may receive the carrier signal and the duty instruction value from the outside, or may generate them internally.

As shown in FIG. 2c, basically, the switching element Q1 in the upper arm of the DC-DC converter 20 is in its on state when the switching instruction signal is at the high level, and is in its off state when the switching instruction signal is at the low level. However, a transmission delay td1 arises in a period from a change of the switching instruction signal from the high level to the low level, to a change of the switching element Q1 from the on state to the off state. Moreover, the transmission delay td1 arises and further a dead time td2 is provided in a period from a change of the switching instruction signal from the low level to the high level, to a change of the switching element Q1 from the off state to the on state. The transmission delay td1 is caused by, for example, the transmission circuit here. Moreover, the dead time is provided by, for example, the transmission circuit and the control apparatus 50.

As shown in FIG. 2d, basically, the switching element Q2 in the lower arm of the DC-DC converter 20 is in its off state when the switching instruction signal takes the high level, and is in its on state when the switching instruction signal takes the low level. However, the transmission delay td1 arises in a period from a change of the switching instruction signal from the low level to the high level, to a change of the switching element Q2 from the on state to the off state. Moreover, the transmission delay td1 arises and further the dead time td2 is provided in a period from a change of the switching instruction signal from the high level to the low level to a change of the switching element Q2 from the off state to the on state. The transmission delay td1 is caused by, for example, the transmission circuit here. Moreover, the dead time is provided by, for example, the transmission circuit and the control apparatus 50.

FIGS. 2e, 2f, and 2g show the waveform of the electric potential V0 at the end of the reactor L1 on the side of the inverter 30, the waveform of a reactor current when it is assumed that no switching delays (transmission delays) and no dead times exist, and the waveform of a real reactor current, respectively, at the time of stepping up. Incidentally, the direction of the reactor current directed from the electric storage device 10 to the switching elements Q1 and Q2 (the direction of an arrow A in FIG. 1) is assumed to be positive.

With reference to FIGS. 2d and 2g, the reactor current rises when the switching element Q2 in the lower arm is in the on state. At this time, the gradient of the waveform of the reactor current (that is, the amount of change of the reactor current per unit time) is VL/L, where VL denotes the voltage of the electric storage device 10 and L denotes the inductance of the reactor L1. On the other hand, when the switching element Q2 is in the off state, the reactor current descends. At this time, the gradient of the waveform of the reactor current is −(VH−VL)/L, where VH denotes the voltage of the smoothing capacitor C2.

FIGS. 2h, 2i, and 2j show the waveform of the electric potential V0 at the end of the reactor L1 on the side of the inverter 30, the waveform of a reactor current when it is assumed that no switching delays (transmission delays) and no dead times exist, and the waveform of a real reactor current, respectively, at the time of stepping down.

With reference to FIGS. 2c and 2j, the reactor current rises when the switching element Q1 in the upper arm is in the off state. At this time, the gradient of the waveform of the reactor current is VL/L. On the other hand, when the switching element Q1 is in the on state, the reactor current descends. At this time, the gradient of the waveform of the reactor current is −(VH−VL)/L.

In the case of trying to acquire a reactor current, it is possible to consider providing a current sensor 21 for detecting the reactor current as shown in FIG. 1, and to perform the A/D conversion of an analog current signal acquired by the current sensor 21 to acquire a digital reactor current value. In a more concrete embodiment, it is possible to consider performing the A/D conversion of a reactor current value at the timing of a peak or a trough of the carrier signal.

As known from FIGS. 2a, 2f, and 2i, if there are no switching delays and dead times, the timings of the peaks and troughs of the carrier signal accord with the timings of the center value of the reactor current (that is, the center timings of the ripples of the reactor current). Consequently, by performing sampling at the timings of the peaks or troughs of the carrier signal, the center value of the reactor current can be acquired.

However, as known from FIGS. 2a, 2g, and 2j, if there are switching delays and dead times, then the timings of the peaks and troughs of the carrier signal shift from the timings of the center value of the reactor current owing to the influences of the switching delays and the dead times. Consequently, if sampling is performed at the timings of the peaks or troughs of the carrier signal, it leads to acquisition of current values that are shifted from the center value of the reactor current. If these current values are used for the control of the reactor current, then the case where the reactor current cannot be accurately controlled is expected.

Incidentally, although it is also possible to consider adjusting sampling timings (A/D timings) in advance so as to perform the sampling at the centers of the ripples of the reactor current, it is difficult to perform the adjustment in advance since there is dispersion of switching delays and the like. Moreover, because the influences of the dead times vary according to the reactor current values, timing errors do not become a constant value.

In consideration of the situation described above, the control apparatus 50 is configured as follows in the present embodiment from the point of view of acquiring the reactor current accurately. In the following, first to seventh embodiments will be shown as the embodiments of the control apparatus 50.

First Embodiment

Figure 3:
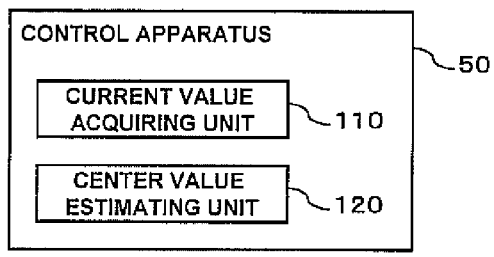
FIG. 3 is a block diagram showing the functional configuration of a control apparatus according to a first embodiment.

FIG. 3 is a block diagram showing the functional configuration of the control apparatus 50 of the first embodiment. In FIG. 3, the control apparatus 50 includes a current value acquiring unit 110 and a center value estimating unit 120.

The current value acquiring unit 110 acquires reactor current values in current rising sections and current descending sections of the waveform of a reactor current at a time interval of a half of the switching period of the switching elements Q1 and Q2. To put it concretely, the current value acquiring unit 110 acquires the reactor current values by performing the A/D conversions of the analog current signals of the current sensor 21 in both the current rising sections and current descending sections of the waveform of the reactor current at the time interval of a half of the period of a carrier signal (carrier period). In a concrete embodiment, the current value acquiring unit 110 acquires the reactor current values in the current rising sections at the timings of the peaks of the carrier signal and acquires the reactor current values in the current descending sections at the timings of the troughs of the carrier signal.

The center value estimating unit 120 estimates the center value $IL_{center}$ of the reactor current on the basis of reactor current values $IL_{up}$ acquired in the current rising sections and reactor current values $IL_{down}$ acquired in the current descending sections by the current value acquiring unit 110. To put it concretely, the center value estimating unit 120 calculates the center value $IL_{center}$ from the current values $IL_{up}$ and $IL_{down}$ in accordance with the following arithmetic formula (4) obtained from the geometric relations among the current values $IL_{up}$, $IL_{down}$, and $IL_{center}$ in the waveform of the reactor current. The arithmetic formula (4) is introduced as follows here.

Figure 4:
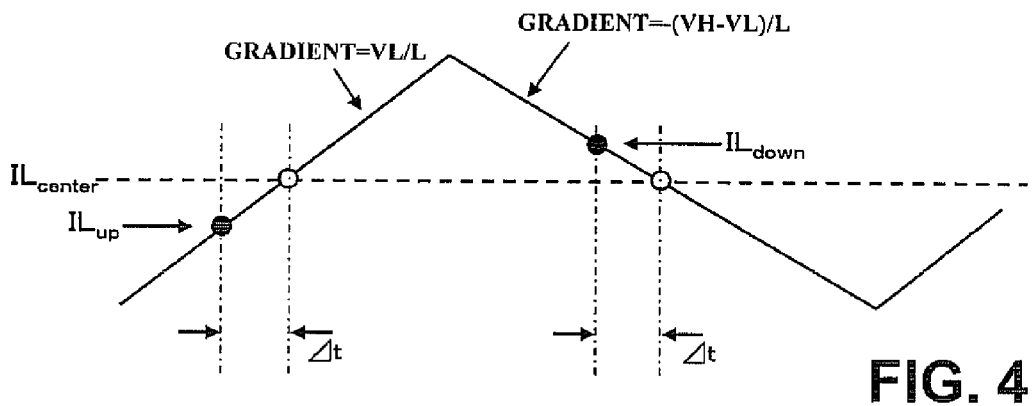
FIG. 4 is a diagram for illustrating a formula for estimating the center value of a reactor current.

FIG. 4 is a diagram for illustrating the formula for estimating the center value of a reactor current, and FIG. 4 shows the waveform of the reactor current. With reference to FIG. 4, the current values $IL_{up}$ and $IL_{down}$ have the relation of the following formula (1) with each other, where Δt denotes the error (discrepancy) between the timing of acquiring a reactor current value and the timing of the center value of the reactor current. The same amounts of errors Δt occur in both of the current rising sections and the current descending sections.

$$IL_{down} - IL_{up} = \Delta t \times VL/L + \Delta t \times (VH - VL)/L \quad (1)$$

Moreover, the current values $IL_{center}$ and $IL_{up}$ have the relation of the following formula (2).

$$IL_{center} - IL_{up} = \Delta t \times VL/L \quad (2)$$

By transforming the formula (2), the following formula (3) can be acquired.

$$\Delta t/L = (IL_{center} - IL_{up})/VL \quad (3)$$

By substituting the formula (3) for the formula (1), the following formula (4) is acquired.

$$IL_{center} = IL_{up} + (IL_{down} - IL_{up}) \times VL/VH \quad (4)$$

As described above, the first embodiment pays attention to the fact that the same amounts of errors Δt occur in both of the current rising sections and the current descending sections, and estimates the center value $IL_{center}$ of a reactor current independent of the errors Δt by negating the influences of the errors Δt by means of the geometric relation because the gradient of the waveform of the reactor current takes the form as shown in FIG. 4.

Figure 5:
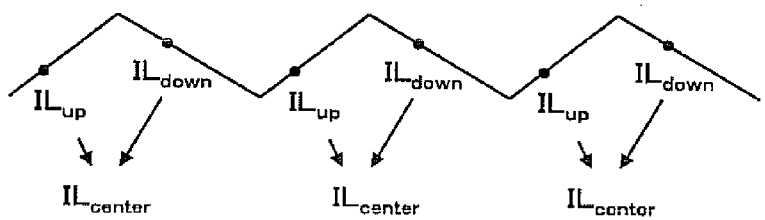
FIG. 5 is a diagram showing examples of current values $IL_{up}$ and $IL_{down}$, and the estimated values of center values $IL_{center}$.
Figure 6:
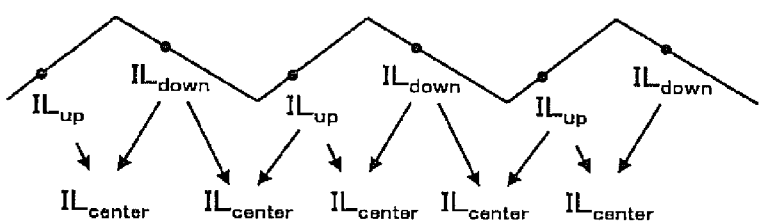
FIG. 6 is a diagram showing other examples of the current values $IL_{up}$ and $IL_{down}$, and the estimated values of the center values $IL_{center}$.

In one embodiment, the control apparatus 50 repeatedly acquires the pairs of the current values $IL_{up}$ and $IL_{down}$, and estimates the center value $IL_{center}$ from each of the pairs to acquire the time series data of the center value $IL_{center}$. In a more concrete embodiment, as shown in FIGS. 5 and 6, the control apparatus 50 repeatedly acquires the current values $IL_{up}$ and $IL_{down}$ alternately at a half period of the carrier period, and estimates the center value $IL_{center}$ from adjoining current values $IL_{up}$ and $IL_{down}$ to acquire the time series data of the center value $IL_{center}$ of the same period as the carrier period, or the time series data of the center value $IL_{center}$ of the half period of the carrier period.

Figure 7:
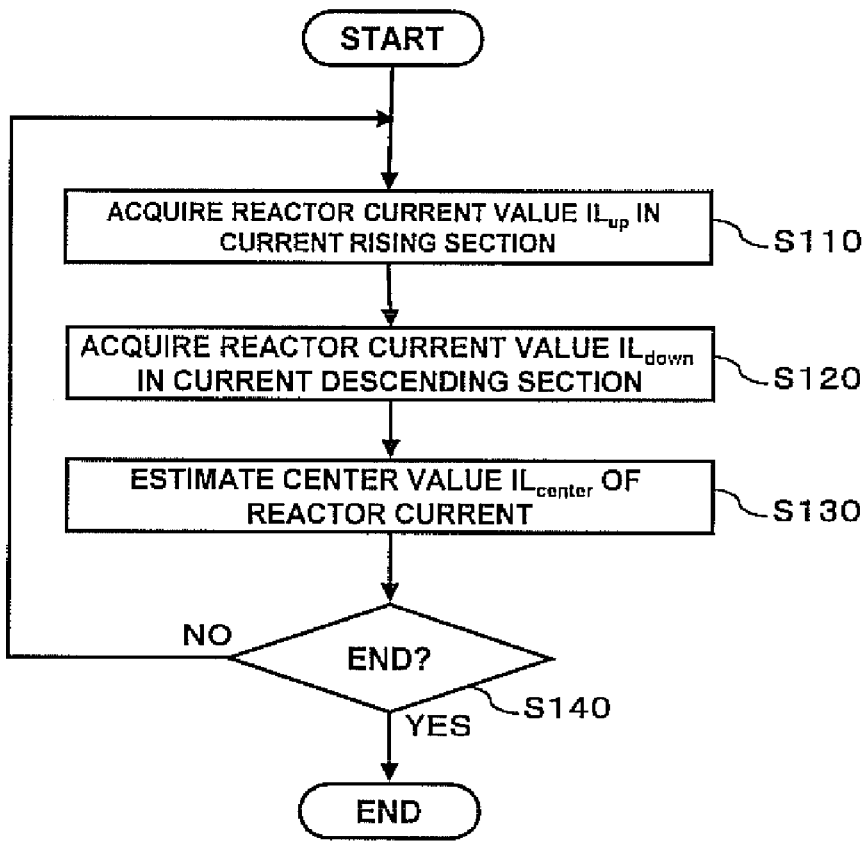
FIG. 7 is a flow chart showing an example of the operation of the control apparatus according to the first embodiment.

FIG. 7 is a flow chart showing an example of the operation of the control apparatus 50 of the first embodiment. In the following, the example of the operation of the control apparatus 50 of the first embodiment will be described with reference to FIG. 7.

The control apparatus 50 acquires a current value $IL_{up}$ in a current rising section (S110).

Next, the control apparatus 50 acquires a current value $IL_{down}$ in a current descending section at a time when a half of the carrier period has elapsed from the acquisition of the current value $IL_{up}$ (S120).

Next, the control apparatus 50 calculates the center value $IL_{center}$ of the reactor current in accordance with the arithmetic formula (4) on the basis of the acquired current values $IL_{up}$ and $IL_{down}$ (S130).

The control apparatus 50 repeatedly executes the processing of steps S110-S130 until a predetermined ending condition is satisfied, and ends the processing when the predetermined ending condition is satisfied (S140).

According to the first embodiment described above, the center value of a reactor current can be estimated, and the center value of the reactor current can be acquired more accurately in comparison with the case of sampling the reactor current at the timings of the peaks and troughs of a carrier signal. Moreover, the first embodiment does not need the prior adjustment of sampling timings. Moreover, it is difficult for the first embodiment to be influenced by the dispersion of switching delays and dead times.

Second Embodiment

Figure 8:
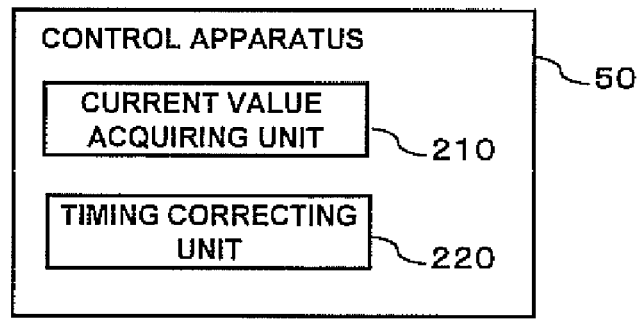
FIG. 8 is a block diagram showing the functional configuration of a control apparatus according to a second embodiment.

FIG. 8 is a block diagram showing the functional configuration of the control apparatus 50 of a second embodiment. In FIG. 8, the control apparatus 50 includes a current value acquiring unit 210 and a timing correcting unit 220.

The current value acquiring unit 210 acquires reactor current values in current rising sections and current descending sections of the waveform of a reactor current at a time interval of a half of the switching period of the switching elements Q1 and Q2. To put it concretely, the current value acquiring unit 210 acquires the reactor current values from the analog current signals of the current sensor 21 in both the current rising sections and current descending sections of the waveform of the reactor current at the time interval of a half of the period of a carrier signal (carrier period).

When a value $(IL_{down}-Il_{up})$ acquired by subtracting the current value $IL_{up}$ acquired in a current rising section from the current value $IL_{down}$ acquired in the current descending section with the current value acquiring unit 210 is positive, then the timing correcting unit 220 corrects the timing of acquiring a reactor current value in a delaying direction. When the value $(IL_{down}-IL_{up})$ is negative, the timing correcting unit 220 corrects the timing of acquiring the reactor current value in an advancing direction. The correcting of the timing of acquiring the reactor current value means to correct an acquiring timing (acquiring position) in the switching periods of the switching elements Q1 and Q2 (to put it concretely, in the period of a carrier signal) or in the period of a ripple of the reactor current here. Incidentally, although the correction amounts of the timings are not especially limited in the second embodiment, the correction amounts are, for example, a predetermined constant value (e.g., 5 μs).

Figure 9:
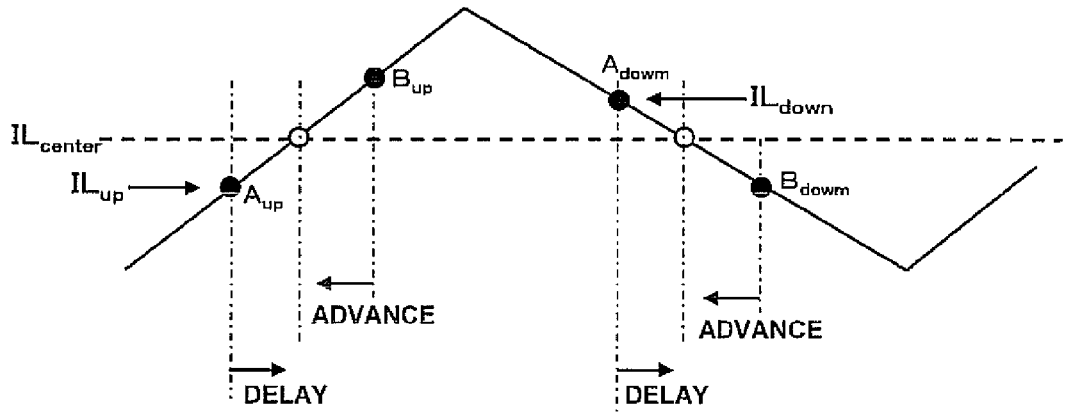
FIG. 9 is a diagram for illustrating the correction of timings in the second embodiment.

FIG. 9 is a diagram for illustrating the corrections of timings in the second embodiment, and shows a waveform of a reactor current. With reference to FIG. 9, when the sampling timings (A/D timings) are earlier than the timings of the center value of the reactor current as sampling points $A_{up}$ and $A_{down}$, then $(IL_{down}-IL_{up})>0$. On the other hand, when the sampling timings are later than the timings of the center value of the reactor current as sampling points $B_{up}$ and $B_{down}$, then $(IL_{down}-IL_{up})<0$. Accordingly, the present embodiment delays the sampling timings at the time of $(IL_{down}-IL_{up})>0$, or advances the sampling timings at the time of $(IL_{down}-IL_{up})<0$.

In an embodiment, the control apparatus 50 acquires the current values $IL_{up}$ and $IL_{down}$, and repeatedly performs the processing of correcting the sampling timings according to the magnitude relations of the current values $IL_{up}$ and $IL_{down}$. That is, the control apparatus 50 acquires the reactor current values, reducing the discrepancies of the sampling timings by feedback control.

Figure 10:
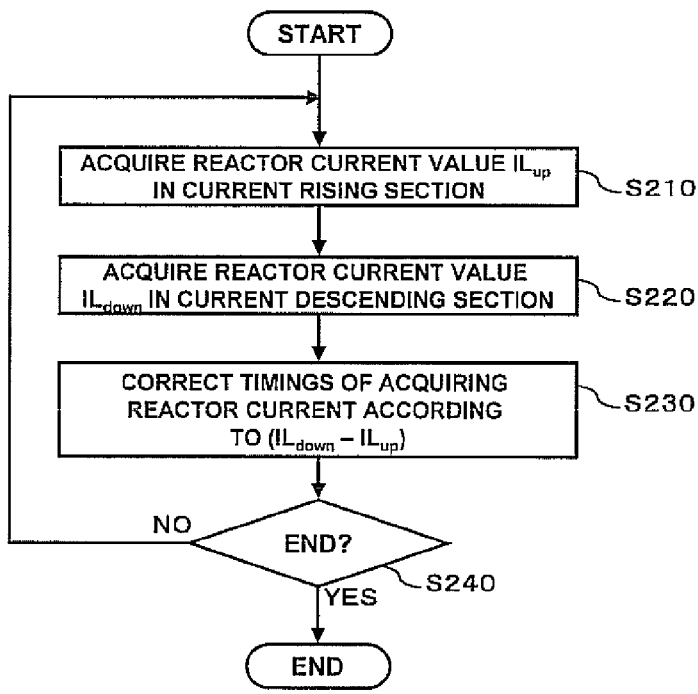
FIG. 10 is a flow chart showing an example of the operation of the control apparatus according to the second embodiment.

FIG. 10 is a flow chart showing an example of the operation of the control apparatus 50 of the second embodiment. In the following, the example of the operation of the control apparatus 50 of the second embodiment will be described with reference to FIG. 10.

The control apparatus 50 acquires a current value $IL_{up}$ in a current rising section (S210). At a first time, the control apparatus 50 acquires the current value $IL_{up}$ at the timing of, for example, a peak of a carrier signal.

Next, the control apparatus 50 acquires a current value $IL_{down}$ in a current descending section at the time when a half of the carrier period has elapsed from the acquisition of the current value $IL_{up}$ (S220). At the first time, the control apparatus acquires the current value $IL_{down}$ at the timing of, for example, a trough of the carrier signal.

Next, the control apparatus 50 corrects the timing of acquiring the reactor current according to $(IL_{down}-Il_{up})$ (S230). For example, when $(IL_{down}-Il_{up})>0$ at the first time, the control apparatus 50 sets a time delayed from the timing of the peak of the carrier signal by a predetermined correcting time (e.g., 5 μs) as a new timing of acquiring the current value $IL_{up}$. The corrected timing is to be used at the time of acquiring the current value $IL_{up}$ at the step S210 at the next time.

The control apparatus 50 repeatedly executes the processing of steps S210-S230 until a predetermined ending condition is satisfied, and ends the processing when the predetermined ending condition is satisfied (S240).

According to the second embodiment described above, the discrepancies between the timings of acquiring a reactor current and the timings of the center value of the reactor current can be reduced according to $(IL_{down}-IL_{up})$, and the errors between the acquired values of the reactor current and the center value thereof can be reduced. Thereby, the center value of the reactor current can be acquired more accurately in comparison with the case of sampling the reactor current at the timings of the peaks and troughs of a carrier signal. Moreover, although the embodiment using the values of the voltages VH and VL as the first embodiment is subjected to the influences of voltage sensors detecting the values of the voltages VH and VL, respectively, the second embodiment does not use the values of the voltages VH and VL, and consequently can avoid the influences of the errors of the voltage sensors.

Third Embodiment

Figure 11:
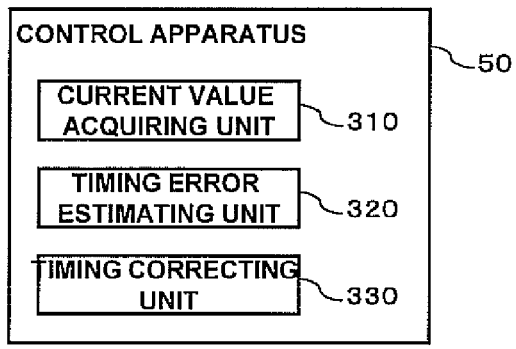
FIG. 11 is a block diagram showing the functional configuration of a control apparatus according to a third embodiment.

FIG. 11 is a block diagram showing the functional configuration of the control apparatus 50 of a third embodiment. In FIG. 11, the control apparatus 50 includes a current value acquiring unit 310, a timing error estimating unit 320, and a timing correcting unit 330.

The current value acquiring unit 310 acquires reactor current values in current rising sections and current descending sections of the waveform of a reactor current at the time interval of a half of the switching period of the switching elements Q1 and Q2. To put it concretely, the current value acquiring unit 310 acquires the reactor current values from the analog current signals of the current sensor 21 in both the current rising sections and current descending sections of the waveform of the reactor current at the time interval of a half of the period of a carrier signal (carrier period).

The timing error estimating unit 320 estimates the errors Δt between the timings of acquiring the reactor current values and the timings of the center value $IL_{center}$ of the reactor current on the basis of the current values $IL_{up}$ acquired in the current rising sections and the current values $IL_{down}$ acquired in the current descending sections by the current value acquiring unit 310. To put it concretely, the timing error estimating unit 320 calculates the errors $\Delta t$ from the current values $IL_{up}$ and $IL_{down}$ in accordance with the following arithmetic formula (6) acquired from the geometric relations between the current values $IL_{up}$ and $IL_{down}$ in the wave form of the reactor current. The arithmetic formula (6) can be introduced here as follows.

With reference to FIG. 4, the current values $IL_{up}$ and $IL_{down}$ have the relation of the following formula (5) with each other.

$$IL_{down} - IL_{up} = \Delta t \times VL/L + \Delta t \times (VH-VL)/L \quad (5)$$

By transforming the formula (5), the following formula (6) can be acquired.

$$\Delta t = (IL_{down} - IL_{up}) \times L/VH \quad (6)$$

The timing correcting unit 330 corrects the timings of acquiring the reactor current values on the basis of the errors $\Delta t$ estimated by the timing error estimating unit 320. To put it concretely, the timing correcting unit 330 shifts the timings of acquiring the reactor current values by the errors $\Delta t$ so that the timings of acquiring the reactor current values may accord with the timings of the center value of the reactor current. To correct the timings of acquiring the reactor current values means to correct the acquiring timings (acquiring positions) in a switching period of the switching elements Q1 and Q2 (to put it concretely, in the period of the carrier signal) or in ripple periods of the reactor current here.

Figure 12:
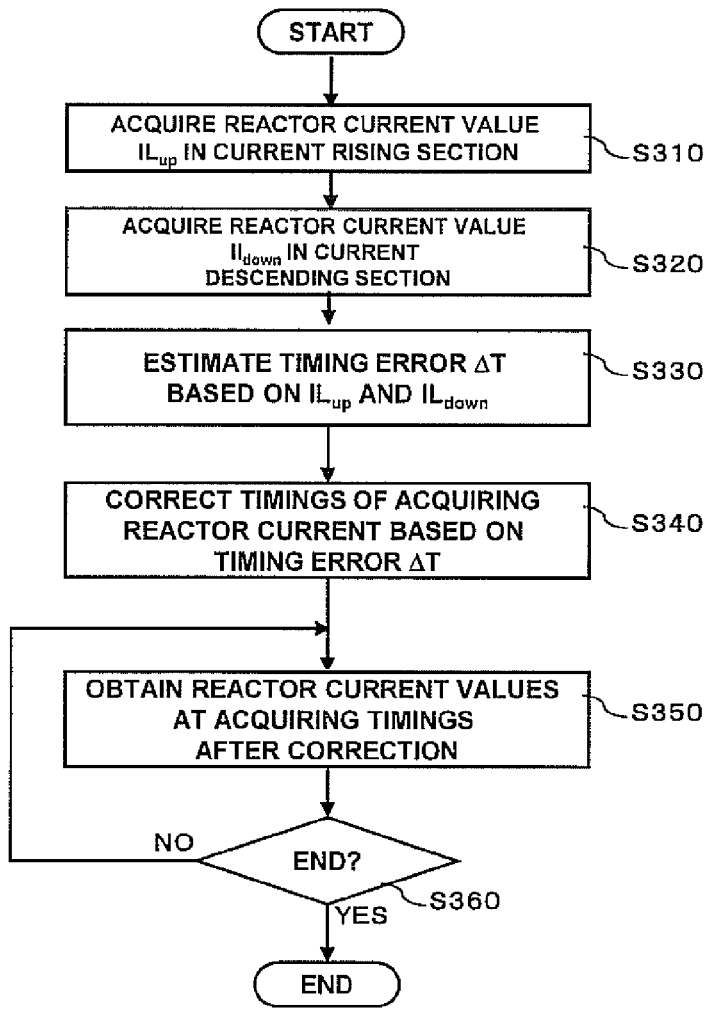
FIG. 12 is a flow chart showing an example of the operation of the control apparatus according to the third embodiment.

FIG. 12 is a flow chart showing an example of the operation of the control apparatus 50 of the third embodiment. In the following, the example of the operation of the control apparatus 50 of the third embodiment will be described with reference to FIG. 12.

The control apparatus 50 acquires a current value $IL_{up}$ in a current rising section (S310). For example, the control apparatus 50 acquires the current value $IL_{up}$ at the timing of a peak of the carrier signal.

Next, the control apparatus 50 acquires a current value $IL_{down}$ in a current descending section at the time when a half of the carrier period has elapsed from the acquisition of the current value $IL_{up}$ (S320). For example, the control apparatus 50 acquires the current value $IL_{down}$ at the timing of a trough of the carrier signal.

Next, the control apparatus 50 calculates the error $\Delta t$ of the timings in accordance with the arithmetic formula (6) on the basis of the acquired current values $IL_{up}$ and $IL_{down}$ (S330).

Next, the control apparatus 50 corrects the timing of acquiring the reactor current value on the basis of the calculated error $\Delta t$ (S340). For example, the control apparatus 50 sets the timing delayed from the timing of the peak of the carrier signal by the error $\Delta t$ as a new timing of acquiring the current value $IL_{up}$.

Since then, the control apparatus 50 acquires the reactor current values at the timings after correction (S350). For example, the control apparatus 50 acquires the reactor current values $IL_{up}$ and $IL_{down}$ at the corrected timings of a half period of the carrier period. Incidentally, the control apparatus 50 may acquire only one of the current values $IL_{up}$ and $IL_{down}$ at the step S350.

The control apparatus 50 repeatedly executes the processing of the step S350 until a predetermined ending condition is satisfied, and ends the processing when the predetermined ending condition is satisfied (S360).

According to the third embodiment described above, by estimating the errors between the timings of acquiring the reactor current and the timings of the center value of the reactor current to correct the errors, the reactor current can be acquired at accurate timings. Thereby, the center value of the reactor current can be more accurately acquired in comparison with the case of sampling the reactor current at the timings of the peaks and troughs of the carrier signal. Moreover, in the case of correcting the timing errors without estimating the timing errors, it can be considered that convergence may take time, or that overshooting may arise at the time of attempting to accelerate the convergence. On the contrary, according to the third embodiment, it becomes possible to adjust the timings of acquiring the reactor current to the timings of the center value of the reactor current more rapidly without any overshooting.

Fourth Embodiment

The control apparatus 50 of a fourth embodiment is almost the same as that of the third embodiment. The descriptions of the common portions of the control apparatus 50 of the fourth embodiment to those of the third embodiment will be omitted or simplified in the following description of the control apparatus 50 of the fourth embodiment.

In the third embodiment described above, the estimate values of the timing errors $\Delta t$ include remaining estimation errors in the case where the detection error of the value of the voltage VH and the dispersion of the inductance L exist. The fourth embodiment makes the estimation errors small.

In the fourth embodiment, the control apparatus 50 repeatedly executes the processing of acquiring the current values $IL_{up}$ and $IL_{down}$, estimating the errors $\Delta t$, and correcting the sampling timings.

Figure 13:
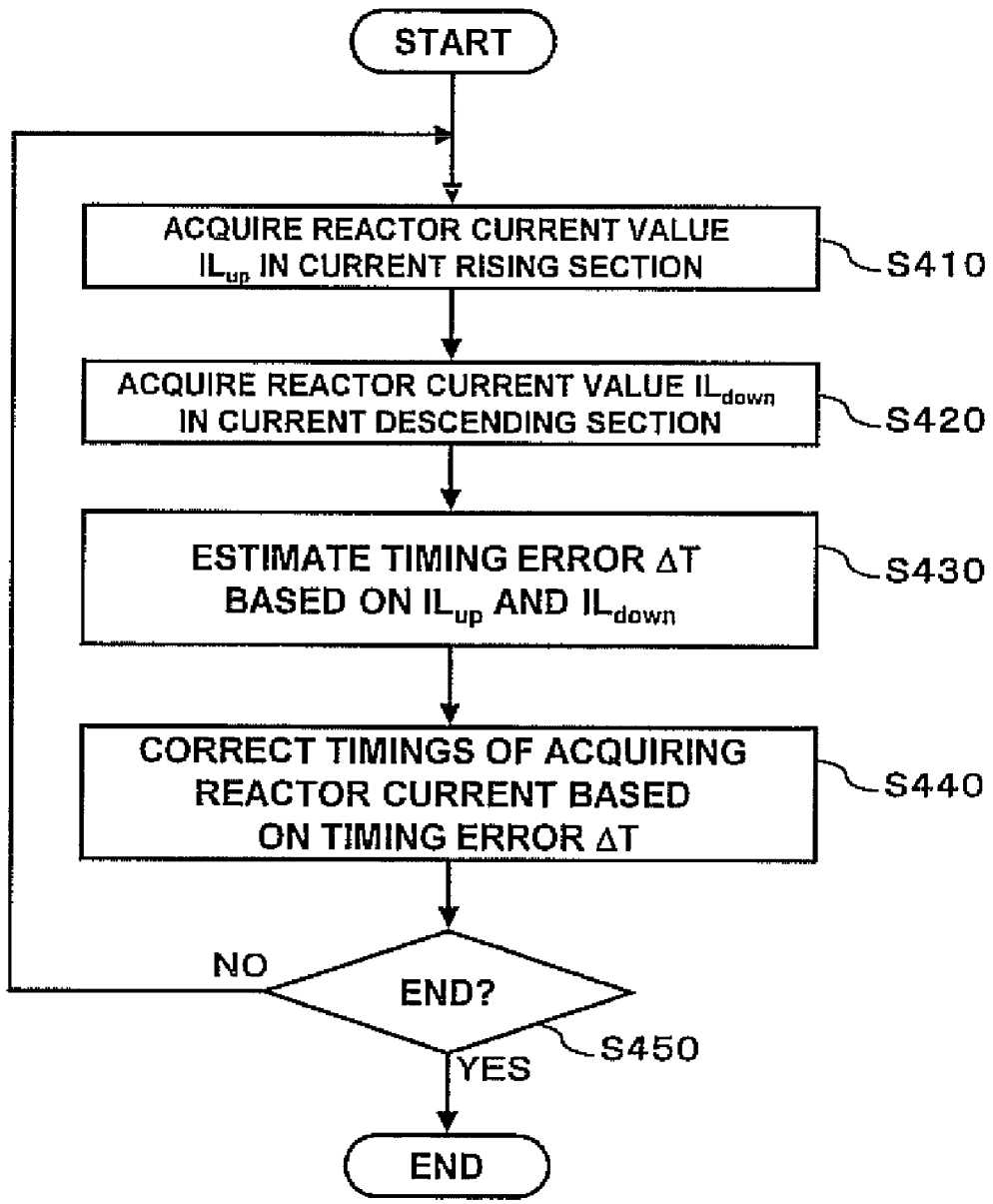
FIG. 13 is a flow chart showing an example of the operation of a control apparatus according to a fourth embodiment.

FIG. 13 is a flow chart showing an example of the operation of the control apparatus 50 of the fourth embodiment. In the following, the example of the operation of the control apparatus 50 of the fourth embodiment will be described with reference to FIG. 13.

The control apparatus 50 acquires a current value $IL_{up}$ in a current rising section (S410). At a first time, the control apparatus 50 acquires the current value $IL_{up}$ at the timing of, for example, a peak of a carrier signal.

Next, the control apparatus 50 acquires a current value $IL_{down}$ in a current descending section at the time when a half of the carrier period has elapsed from the acquisition of the current value $IL_{up}$ (S420). At the first time, the control apparatus 50 acquires the current value $IL_{down}$ at the timing of, for example, a trough of the carrier signal.

Next, the control apparatus 50 calculates the error $\Delta t$ of the timings in accordance with the arithmetic formula (6) on the basis of the acquired current values $IL_{up}$ and $IL_{down}$ (S430).

Next, the control apparatus 50 corrects the timings of acquiring the reactor current values on the basis of the calculated error $\Delta t$ (S440). At the first time, the control apparatus 50 sets, for example, the timing delayed from the timing of the peak of the carrier signal by the error $\Delta t$ as a new timing of acquiring the current value $IL_{up}$. The timing after the correction is to be used for the acquisition of the current value $IL_{up}$ at the step S410 in the next processing.

The control apparatus 50 repeatedly executes the processing of the steps S410-S440 until a predetermined ending condition is satisfied, and ends the processing when the predetermined ending condition is satisfied (S450).

According to the fourth embodiment described above, by repeating the acquisition of the current values $IL_{up}$ and $IL_{down}$, the estimation of the error $\Delta t$, and the correction of the timings based on the error $\Delta t$, the error $\Delta t$ can be gradually reduced, and the center value of the reactor current can be more accurately acquired in comparison with the case of sampling the reactor current at the timings of the peaks and troughs of the carrier signal. Moreover, in the case of correcting the timing errors without estimating the timing errors, it can be considered that convergence may take time, or that overshooting may arise at the time of attempting to accelerate the convergence. On the contrary, according to the fourth embodiment, it becomes possible to adjust the timings of acquiring the reactor current to the timings of the center value of the reactor current rapidly without any overshooting.

Fifth Embodiment

The control apparatus 50 of a fifth embodiment is a combination of that of the first embodiment and that of the second embodiment.

To put it concretely, in the fifth embodiment, the control apparatus 50 includes a current value acquiring unit, a timing correcting unit, and a center value estimating unit. Then, the control apparatus 50 acquires the current values $IL_{up}$ and $IL_{down}$, corrects sampling timings according to ($IL_{up}-IL_{down}$), acquires the current values $IL_{up}$ and $IL_{down}$ at the sampling timings after the correction, and estimates the center value $IL_{center}$ of a reactor current on the basis of the current values $IL_{up}$ and $IL_{down}$. In an embodiment, while the control apparatus 50 repeatedly performing the processing of acquiring the current values $IL_{up}$ and $IL_{down}$ and correcting the sampling timings according to the magnitude relations of the acquired current values $IL_{up}$ and $IL_{down}$, the control apparatus 50 estimates the center value $IL_{center}$ on the basis of the acquired current values $IL_{up}$ and $IL_{down}$ to acquire the time series data of the center value $IL_{center}$.

Figure 14:
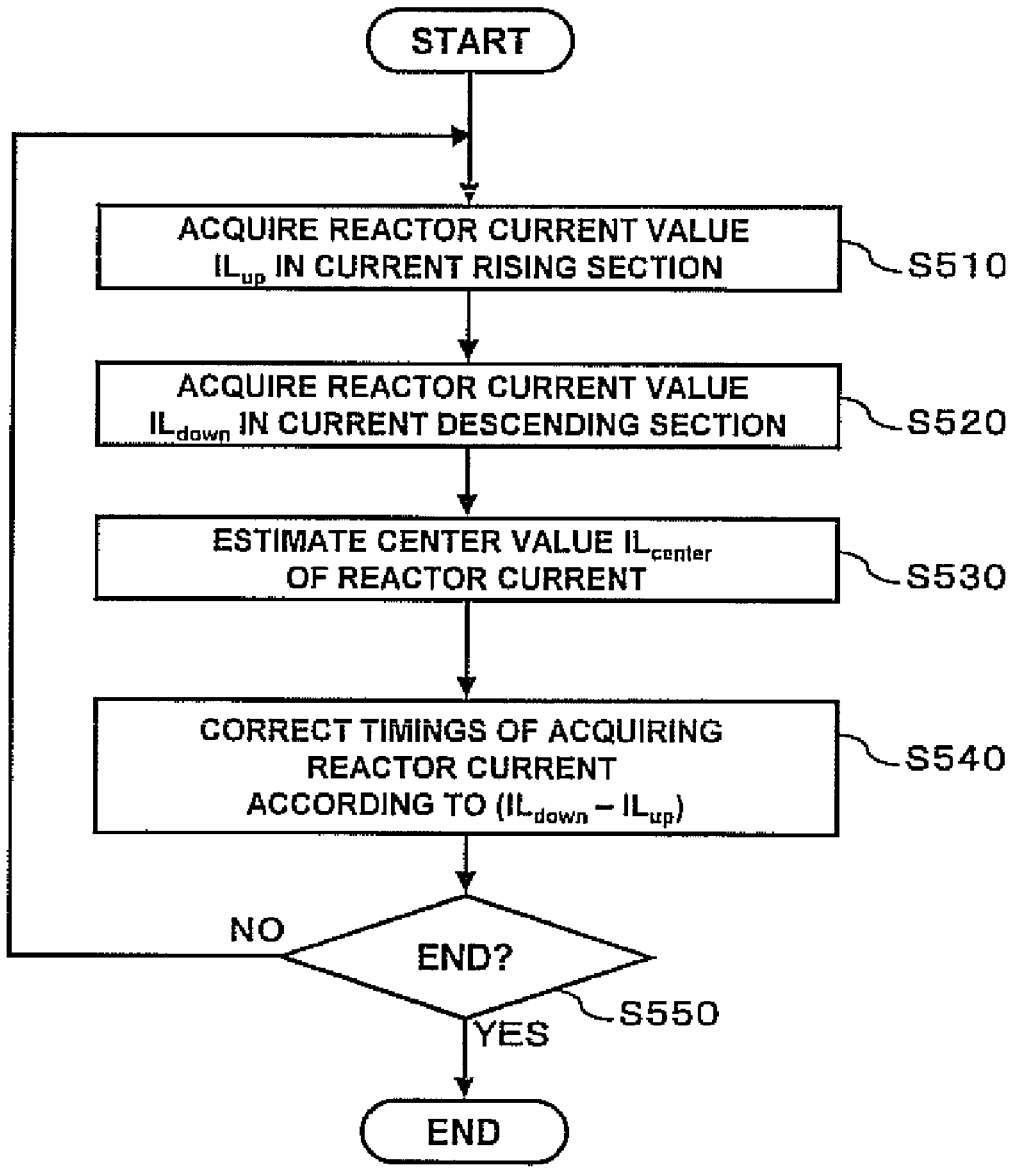
FIG. 14 is a flow chart showing an example of the operation of a control apparatus according to a fifth embodiment.

FIG. 14 is a flow chart showing an example of the operation of the control apparatus 50 of the fifth embodiment. In the following, the example of the operation of the control apparatus 50 of the fifth embodiment will be described with reference to FIG. 14.

The control apparatus 50 acquires a current value $IL_{up}$ in a current rising section (S510). At a first time, the control apparatus 50 acquires the current value $IL_{up}$ at the timing of, for example, a peak of a carrier signal.

Next, the control apparatus 50 acquires a current value $IL_{down}$ in a current descending section at the time when a half of the carrier period has elapsed from the acquisition of the current value $IL_{up}$ (S520). At the first time, the control apparatus 50 acquires the current value $IL_{down}$ at the timing of, for example, a trough of the carrier signal.

Next, the control apparatus 50 calculates the center value $IL_{center}$ of the reactor current in accordance with the arithmetic formula (4) on the basis of the acquired current values $IL_{up}$ and $IL_{down}$ (S530).

Moreover, the control apparatus 50 corrects the timing of acquiring the reactor current according to ($IL_{down}-IL_{up}$) (S540). For example, when ($IL_{down}-IL_{up}$)>0 at the first time, the control apparatus 50 sets a timing delayed from the timing of the peak of the carrier signal by a predetermined correcting time (e.g., 5 μs) as a new timing of acquiring the current value $IL_{up}$. The timing after the correction is to be used at the time of acquiring the current value $IL_{up}$ at step S510 in the next processing.

The control apparatus 50 repeatedly executes the processing of steps S510-S540 until a predetermined ending condition is satisfied, and ends the processing when the predetermined ending condition is satisfied (S550).

According to the fifth embodiment described above, the center value of a reactor current can be estimated on the basis of the reactor current values acquired at the timings after the timing errors have been corrected, and consequently the center value of the reactor current can be acquired more accurately.

For example, since the first embodiment uses the values of the voltages VH and VL for the estimation of the center value of the reactor current, an error is caused in the estimated value of the center value owing to the influence of a sensor error, if the sensor error exists. The caused error becomes ($IL_{down}-IL_{up}$)×Δ(VL/VH). According to the fifth embodiment, by correcting the timing error, ($IL_{down}-IL_{up}$) can be reduced, and consequently the estimation error ($IL_{down}-IL_{up}$)×Δ(VL/VH) of the center value of the reactor current can be made smaller. That is, it becomes difficult for the control apparatus 50 to be influenced by the detection errors of the voltages VH and VL, and more accurate estimation of the center value of the reactor current can be performed.

Moreover, since the fifth embodiment performs the estimation of the center value of the reactor current on the basis of the acquired current values, more accurate estimation of the center value of the reactor current becomes possible in comparison with the case of not performing the estimation of the center value.

Sixth Embodiment

The control apparatus 50 of a sixth embodiment is a combination of that of the first embodiment and that of the third embodiment.

To put it concretely, in the sixth embodiment, the control apparatus 50 includes a current value acquiring unit, a timing error estimating unit, a timing correcting unit, and a center value estimating unit. Then, the control apparatus 50 acquires the current values $IL_{up}$ and $IL_{down}$, estimates a timing error Δt on the basis of the acquired current values $IL_{up}$ and $IL_{down}$, corrects sampling timings on the basis of the estimated timing error Δt, acquires the current values $IL_{up}$ and $IL_{down}$ at the sampling timings after the correction, and estimates the center value $IL_{center}$ of a reactor current on the basis of the current values $IL_{up}$ and $IL_{down}$.

Figure 15:
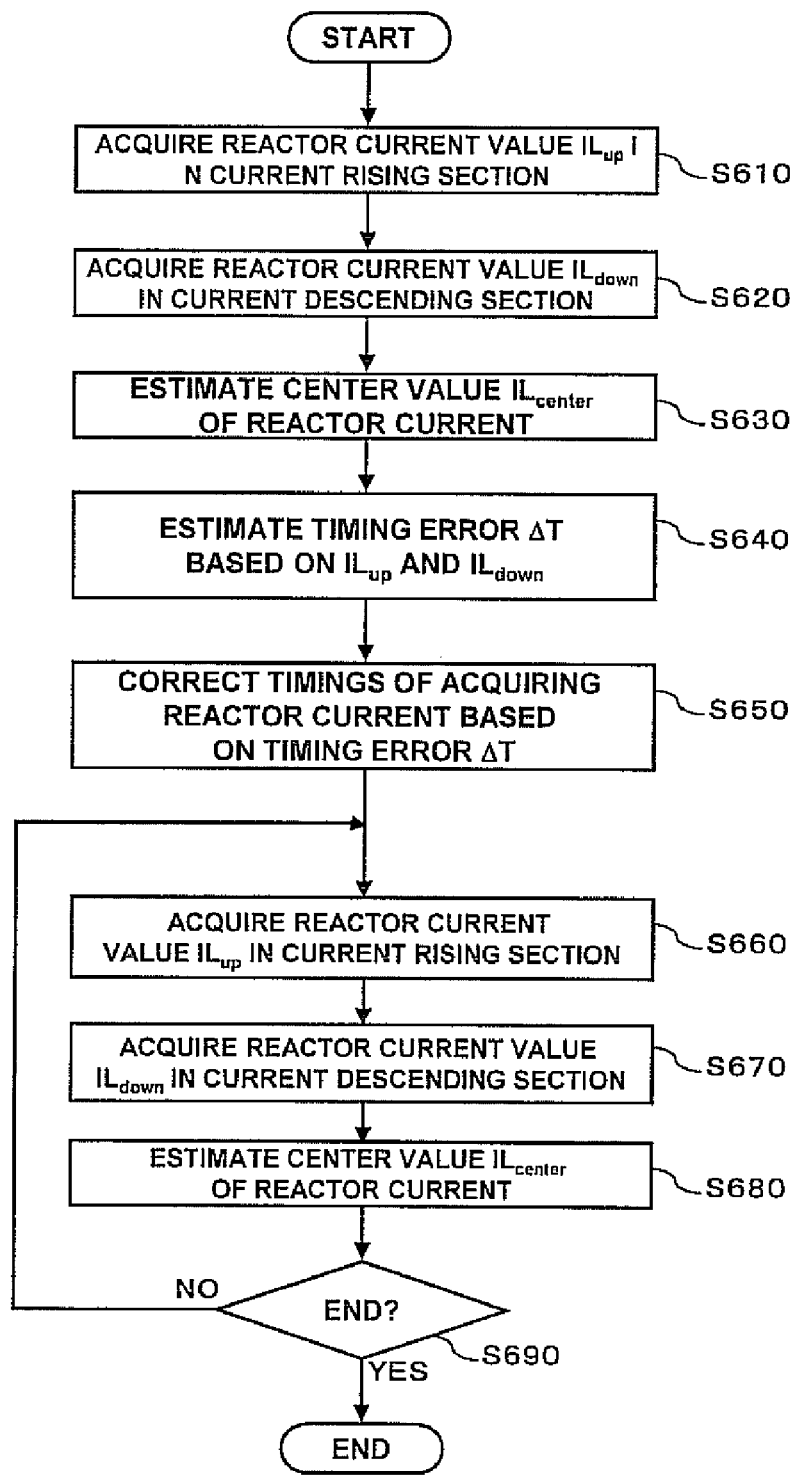
FIG. 15 is a flow chart showing an example of the operation of a control apparatus according to a sixth embodiment.

FIG. 15 is a flow chart showing an example of the operation of the control apparatus 50 of the sixth embodiment. In the following, the example of the operation of the control apparatus 50 of the sixth embodiment will be described with reference to FIG. 15.

The control apparatus 50 acquires a current value $IL_{up}$ in a current rising section (S610). The control apparatus 50 acquires the current value $IL_{up}$ at the timing of, for example, a peak of the carrier signal.

Next, the control apparatus 50 acquires a current value $IL_{down}$ in a current descending section at the time when a half of the carrier period has elapsed from the acquisition of the current value $IL_{up}$ (S620). The control apparatus 50 acquires the current value $IL_{down}$ at the timing of, for example, a trough of the carrier signal.

Next, the control apparatus 50 calculates the center value $IL_{center}$ of the reactor current in accordance with the arithmetic formula (4) on the basis of the acquired current values $IL_{up}$ and $IL_{down}$ (S630).

Moreover, the control apparatus 50 calculates the timing error Δt in accordance with the arithmetic formula (6) on the basis of the acquired current values $IL_{up}$ and $IL_{down}$ (S640).

Next, the control apparatus 50 corrects the timings of acquiring the reactor current values on the basis of the calculated error Δt (S650). For example, the control apparatus 50 sets a timing delayed by the error Δt from the timing of the peak of the carrier signal as a new timing of acquiring the current value $IL_{up}$.

Next, the control apparatus 50 acquires a current value $IL_{up}$ in a current rising section at the timing after the correction (S660).

Next, the control apparatus 50 acquires a current value $IL_{down}$ in a current descending section at the time when a half of the carrier period has elapsed after the acquisition of the current value $IL_{up}$ (S670).

The control apparatus 50 calculates the center value $IL_{center}$ of the reactor current in accordance with the arithmetic formula (4) on the basis of the acquired current values $IL_{up}$ and $IL_{down}$ (S680).

The control apparatus 50 repeatedly executes the processing of the steps S660-S680 until a predetermined ending condition is satisfied, and ends the processing when the predetermined ending condition is satisfied (S690).

According to the sixth embodiment described above, similar advantages to those of the fifth embodiment can be acquired.

Seventh Embodiment

The control apparatus 50 of a seventh embodiment is a combination of that of a first embodiment and that of a fourth embodiment.

To put it concretely, in the seventh embodiment, the control apparatus 50 includes a current value acquiring unit, a timing error estimating unit, a timing correcting unit, and a center value estimating unit. Then, while the control apparatus 50 repeatedly performs the processing of acquiring the current values $IL_{up}$ and $IL_{down}$, estimating a timing error $\Delta t$ on the basis of the acquired current values $IL_{up}$ and $IL_{down}$, and correcting the sampling timings on the basis of the estimated timing error $\Delta t$, the control apparatus 50 performs the processing of estimating the center value $IL_{center}$ of a reactor current on the basis of the current values $IL_{up}$ and $IL_{down}$.

Figure 16:
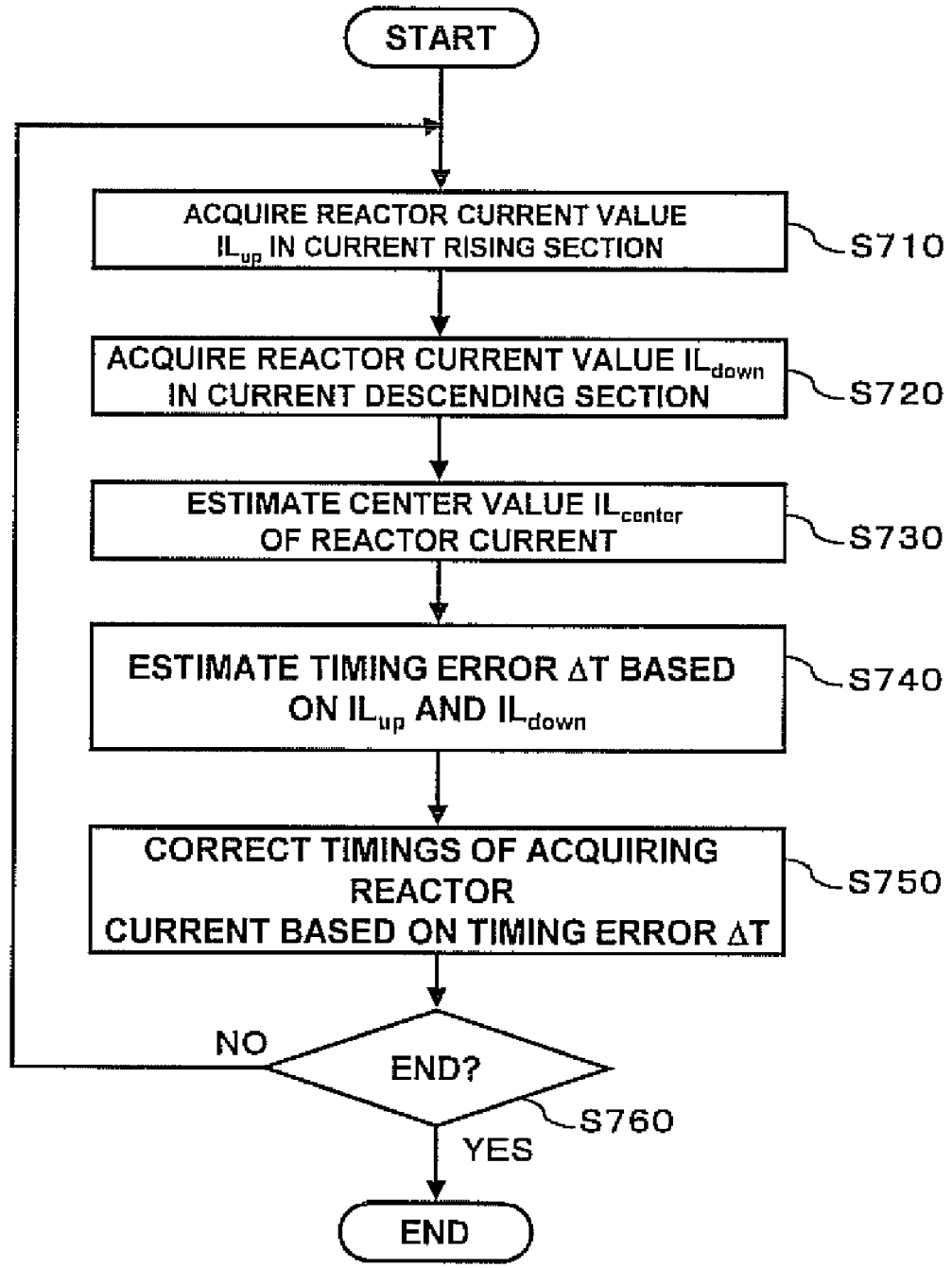
FIG. 16 is a flow chart showing an example of the operation of a control apparatus according to a seventh embodiment.

FIG. 16 is a flow chart showing an example of the operation of the control apparatus 50 of the seventh embodiment. In the following, the example of the operation of the control apparatus 50 of the seventh embodiment will be described with reference to FIG. 16.

The control apparatus 50 acquires a current value $IL_{up}$ in a current rising section (S710). At a first time, the control apparatus 50 acquires the current value $IL_{up}$ at the timing of, for example, a peak of the carrier signal.

Next, the control apparatus 50 acquires a current value $IL_{down}$ in a current descending section at the time when a half of the carrier period has elapsed from the acquisition of the current value $IL_{up}$ (S720). At the first time, the control apparatus 50 acquires the current value $IL_{down}$ at the timing of, for example, a trough of the carrier signal.

Then, the control apparatus 50 calculates the center value $IL_{center}$ of the reactor current in accordance with the arithmetic formula (4) on the basis of the acquired current values $IL_{up}$ and $IL_{down}$ (S730).

Moreover, the control apparatus 50 calculates an error $\Delta t$ of the timings in accordance with the arithmetic formula (6) on the basis of the acquired current values $IL_{up}$ and $IL_{down}$ (S740).

Then, the control apparatus 50 corrects the timings of acquiring the reactor current values on the basis of the calculated error $\Delta t$ (S750). At the first time, the control apparatus 50 sets, for example, the timing delayed from the timing of a peak of the carrier signal by the error $\Delta t$ as a new timing of acquiring the current value $IL_{up}$. The timing after the correction is to be used for the acquisition of the current value $IL_{up}$ at the step S710 in the next processing.

The control apparatus 50 repeatedly executes the processing of the steps S710-S750 until a predetermined ending condition is satisfied, and ends the processing when the predetermined ending condition is satisfied (S760).

According to the seventh embodiment described above, similar advantages to those of the fifth embodiment can be acquired.

Figure 17:
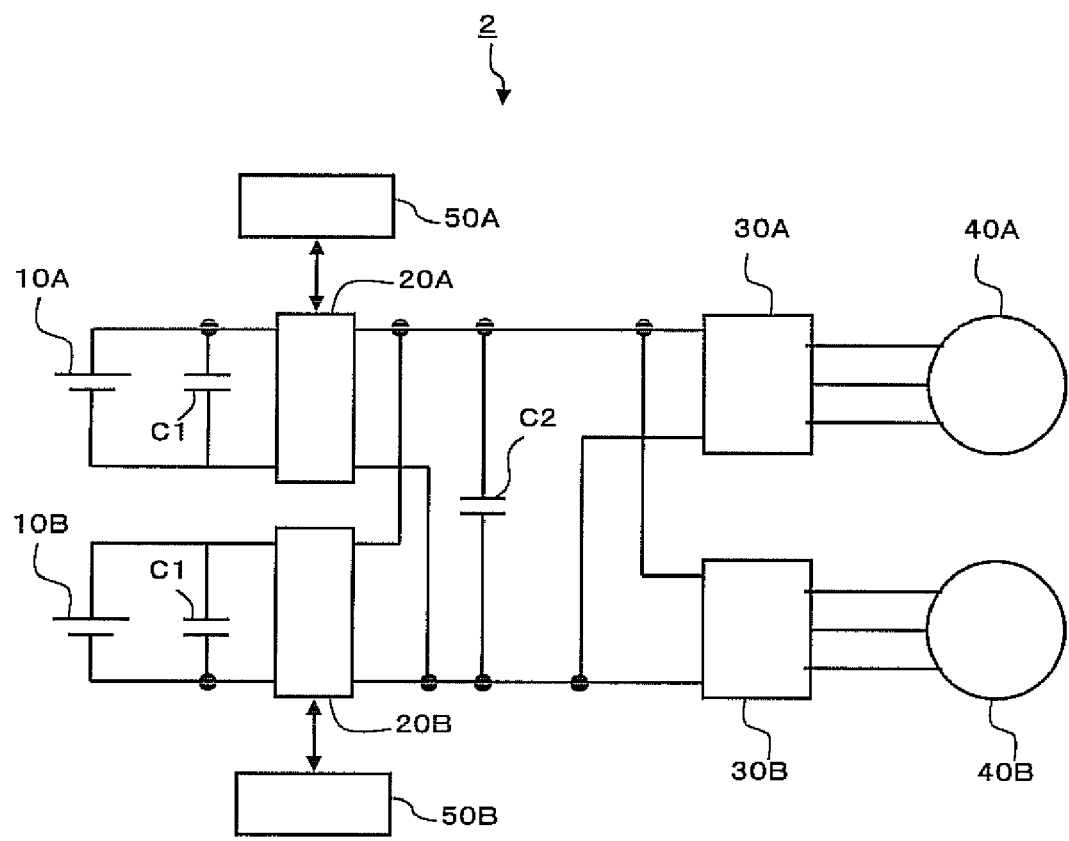
FIG. 17 is a diagram showing the schematic configuration of an electric vehicle including two systems of DC-DC converters.

FIG. 17 is a diagram showing the schematic configuration of an electric vehicle 2 including two systems of DC-DC converters and control apparatus of the DC-DC converters according to the present embodiment.

In the example of FIG. 17, the electric vehicle 2 includes the two DC-DC converters 20A and 20B. Similarly to the case of FIG. 1, electric storage devices 10A and 10B are connected to the DC-DC converters 20A and 20B, respectively, and common smoothing capacitors C1 and C2 are connected to the DC-DC converters 20A and 20B. Two inverters 30A and 30B are connected to the smoothing capacitor C2 in parallel with each other. Drive motors 40A and 40B are connected to the inverters 30A and 30B, respectively.

The drive motor 40A mainly operates as a generator. To put it concretely, the drive motor 40A receives the supply of electric power from the inverter 30A to operate as an electric motor, which starts a not shown engine by cranking the engine. Moreover, the drive motor 40A performs the generation by being rotated by the driving force of the engine after the starting of the engine. The alternating-current power generated by the drive motor 40A is converted into direct-current power by the inverter 30A to be charged in the electric storage devices 10A and 10B or to be used for the driving of the drive motor 40B.

The drive motor 40B mainly operates as an electric motor. To put it concretely, the drive motor 40B receives the supply of electric power from the inverter 30B to generate torque for the rotation drive of a not shown wheel at the time of power running. Moreover, the drive motor 40B is rotated by the wheel to perform generation at the time of regenerative braking. The alternating-current power generated by the drive motor 40B is converted into direct-current power by the inverter 30B to be charged in the electric storage devices 10A and 10B.

Because the electric storage devices 10A and 10B, the DC-DC converters 20A and 20B, the inverters 30A and 30B, and the drive motors 40A and 40B of FIG. 17 are respectively the same as corresponding components in FIG. 1, their detailed descriptions are omitted here.

The electric vehicle 2 includes control apparatus 50A and 50B for the control of the DC-DC converters 20A and 20B, respectively.

The control apparatus 50A controls the DC-DC converter 20A so that the voltage VH of the smoothing capacitor C2 may be kept constant on the basis of the detection value of the voltage VH.

The control apparatus 50B acquires the reactor current of the DC-DC converter 20B in a similar way to that of FIG. 1 (to put it concretely, by any of the first to seventh embodiments described above), controls the reactor current on the basis of the acquired values of the reactor current, and thereby controls the electric power to be supplied to the smoothing capacitor C2 side.

Incidentally, the present invention is not limited to the embodiments described above, but may be variously changed without departing from the sprit and scope of the present invention.

For example, although the control apparatus turning on and off the switching elements Q1 and Q2 alternately at the time of stepping up have been described in the aforesaid embodiments, the switching element Q1 may be always in its off state while performing the control of turning on and off the switching element Q2. Moreover, although the control apparatus turning on and off the switching elements Q1 and Q2 alternately at the time of stepping down have been described in the aforesaid embodiments, the switching element Q2 may be always in its off state while performing the control of turning on and off the switching element Q1.

Moreover, although the case of acquiring the current values in the order of a current rising section and current descending section has been illustrated in the aforesaid embodiments, the current values may be acquired in the order of a current descending section and current rising section.

Moreover, the object of the control of the control apparatus of the present invention is not limited to the bidirectional DC-DC converter, but may be a step-up converter or a step-down converter. For example, the object may be the step-up converter including the reactor L1, the switching element Q2 for stepping up, and the diode D1 for stepping up, or may be the step-down converter including the reactor L1, the switching element Q1 for stepping down, and the diode D2 for stepping down.

What is claimed is:

1. A control apparatus of a DC-DC converter including a reactor and a switching element, the apparatus repeating an accumulation and a discharge of energy of the reactor by a switching operation of the switching element to convert a direct-current input voltage for acquiring a direct-current output voltage, the apparatus characterized in comprising:

a current value acquiring unit that acquires current values of the reactor in a current rising section and a current descending section of a current waveform of the reactor at a time interval of a half of a switching period of the switching element; and a center value estimating unit that estimates a center value of a current of the reactor based on the current values acquired in the current rising section and the current descending section.

2. The control apparatus of a DC-DC converter according to claim 1, characterized in further comprising a timing correcting unit that corrects timings of acquiring the current values of the reactor in a delaying direction when a value acquired by subtracting the current value acquired in the current rising section from the current value acquired in the current descending section is positive, and corrects the timings of acquiring the current values of the reactor in an advancing direction when the value acquired by the subtraction is negative.

3. The control apparatus of a DC-DC converter according to claim 1, characterized in further comprising:

a timing error estimating unit that estimates an error between timings of acquiring the current values of the reactor and timings of the center value of the current of the reactor based on the current values acquired in the current rising section and the current descending section; and a timing correcting unit that corrects the timings of acquiring the current values of the reactor based on the estimated error.

4. The control apparatus of a DC-DC converter according to claim 3, characterized in that the control apparatus of a DC-DC converter repeatedly executes processing of acquiring the current values, estimating the error, and correcting the timings.

5. A control apparatus of a DC-DC converter including a reactor and a switching element, the apparatus repeating an accumulation and a discharge of energy of the reactor by a switching operation of the switching element to convert a direct-current input voltage for acquiring a direct-current output voltage, the apparatus characterized in comprising:

a current value acquiring unit that acquires current values of the reactor in a current rising section and a current descending section of a current waveform of the reactor at a time interval of a half of a switching period of the switching element; and a timing correcting unit that corrects timings of acquiring the current values of the reactor in a delaying direction when a value acquired by subtracting the current value acquired in the current rising section from the current value acquired in the current descending section is positive, and corrects the timings of acquiring the current values of the reactor in an advancing direction when the value acquired by the subtraction is negative.

6. A control apparatus of a DC-DC converter including a reactor and a switching element, the apparatus repeating an accumulation and a discharge of energy of the reactor by a switching operation of the switching element to convert a direct-current input voltage for acquiring a direct-current output voltage, the apparatus characterized in comprising:

a current value acquiring unit that acquires current values of the reactor in a current rising section and a current descending section of a current waveform of the reactor at a time interval of a half of a switching period of the switching element;

a timing error estimating unit that estimates an error between timings of acquiring the current values of the reactor and timings of a center value of a current of the reactor based on the current values acquired in the current rising section and the current descending section; and a timing correcting unit that corrects the timings of acquiring the current values of the reactor based on the estimated error.

7. The control apparatus of a DC-DC converter according to claim 6, characterized in that the control apparatus of a DC-DC converter repeatedly executes processing of acquiring the current values, estimating the error, and correcting the timings.

* * * * *